Sept. 10, 1935.  L. S. WILLIAMS  2,013,936
WEIGHING SCALE
Filed March 1, 1932   3 Sheets-Sheet 1
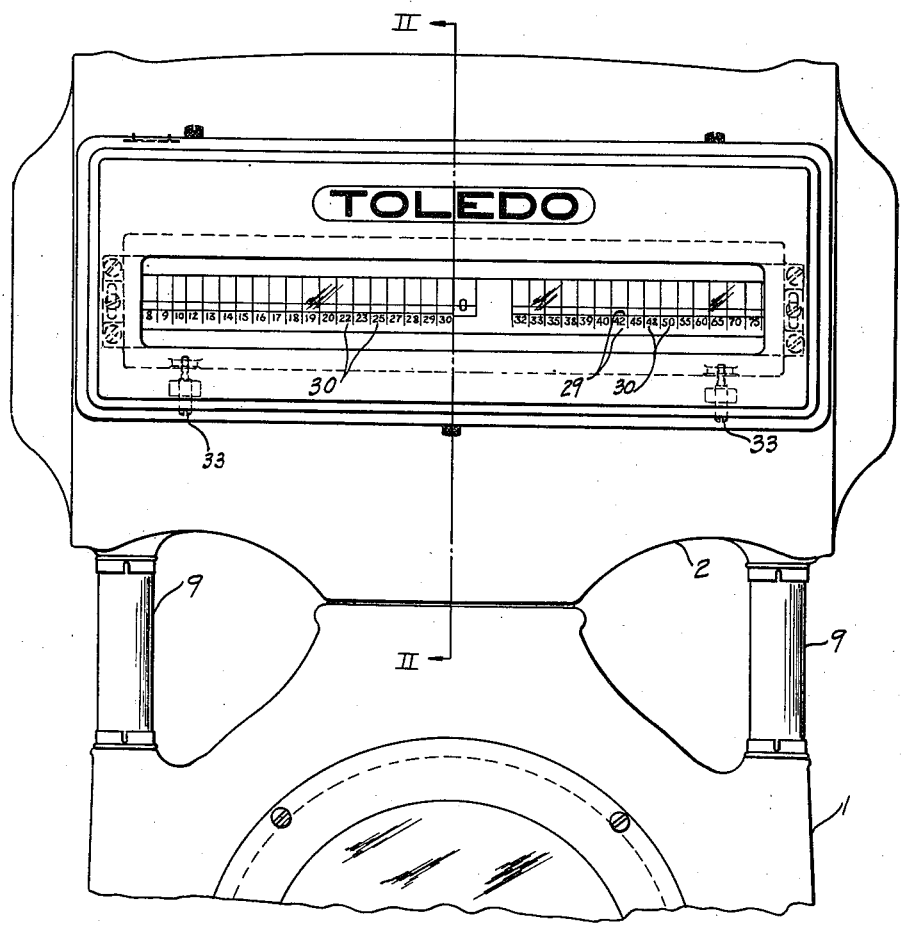
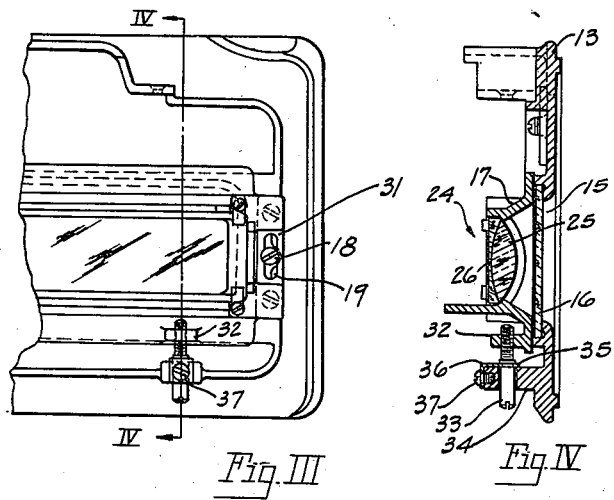
Lawrence S. Williams.
INVENTOR.
BY *Marshall*
ATTORNEY.

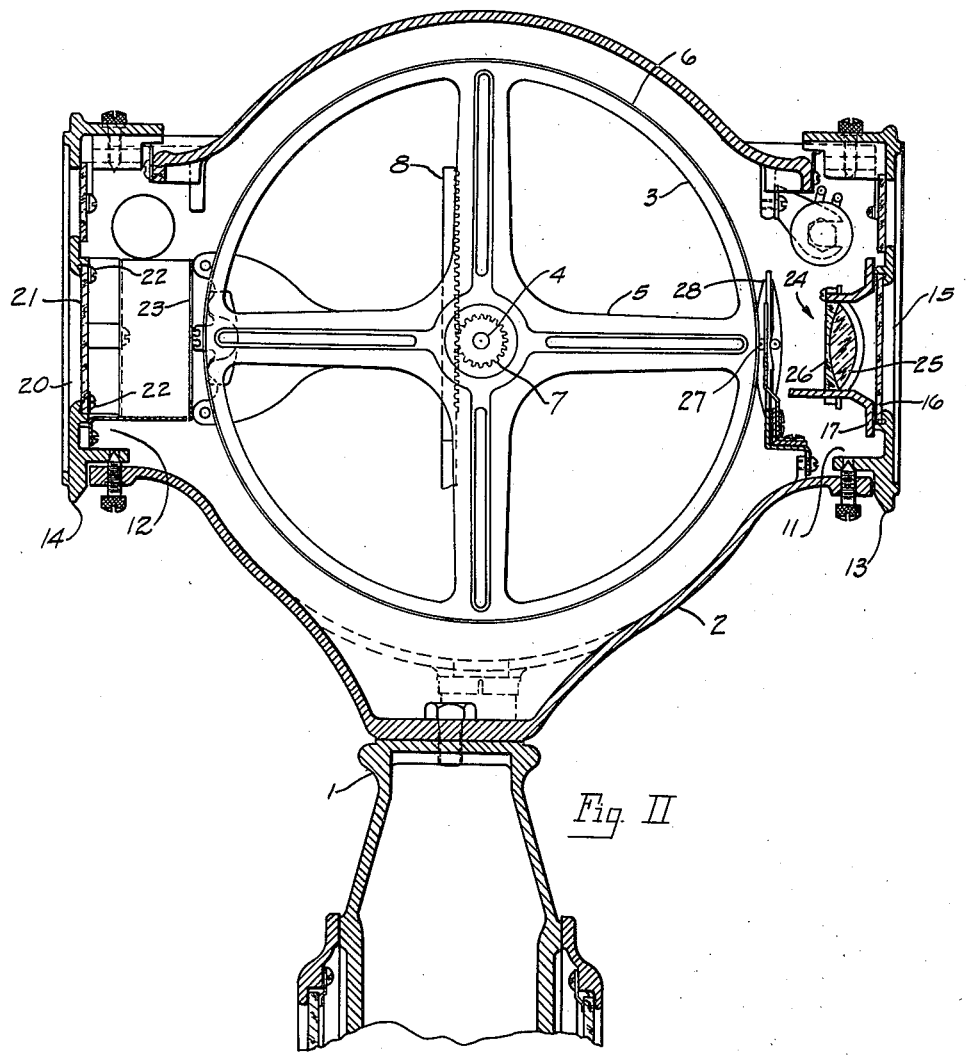

Sept. 10, 1935. L. S. WILLIAMS 2,013,936
WEIGHING SCALE
Filed March 1, 1932 3 Sheets-Sheet 3
~~36890~~     ~~36890~~
~~36890~~     ~~36890~~
~~36890~~     ~~36890~~
*Fig. VI.*     *Fig. V.*
12457     12457
*Fig. VII*     *Fig. VIII*
Lawrence S. Williams
INVENTOR.
BY 
ATTORNEY.

Patented Sept. 10, 1935

2,013,936

UNITED STATES PATENT OFFICE 2,013,936

WEIGHING SCALE

Lawrence S. Williams, Toledo, Ohio, assignor to Toledo Scale Manufacturing Company, Toledo, Ohio, a corporation of New Jersey Application March 1, 1932, Serial No. 596,073

3 Claims. (Cl. 88—1)

This invention relates to improvements in weighing scales and particularly in the indication of weighing scales which are adapted to visually indicate weights and computed values on cylindrical charts. It is very desirable that scales of this type compute values at large numbers of unit prices and it is also desirable that each computation be designated by a numeral or that there be at least a numeral for every other computation so that the merchant need not make mental additions or difficult interpolations in obtaining total values of goods weighed. It is also highly desirable that the indication be shown by numerals which are large and distinct and of such shape that they may be read with little or no effort on the operator's part, thus obviating errors.

The principal object of my invention is the provision of improved means which provide the maximum number of computations with a minimum size chart.

Another object is the provision of improved means for magnifying chart indicia.

Still another object is the provision of an improved combination between a magnifying lens and chart indicia.

A further object is the provision of improved co-operating characteristics between an index line and the computing numerals.

Still another object is the provision of improved means for adjusting the position of the axis of the magnifying lens in relation to the axis of the chart.

These and other objects and advantages will be apparent from the following description in which reference is had to the accompanying drawings and in which similar reference numerals designate similar parts throughout the several views.

In the drawings:—

Figure I is a fragmentary front elevational view of a scale embodying my invention.

Figure II is a cross sectional view thereof substantially along the line II—II of Figure I.

Figure III is an enlarged fragment of the indicating scroll viewed from the back, showing the lens adjusting means in detail.

Figure IV is a cross sectional view thereof substantially along the line IV—IV of Figure III.

Figure V shows a plurality of groups of numerals of a type heretofore used on charts of the type herein referred to and shows the index line in three different relative positions.

Figure VI shows a plurality of groups of numerals of my improved design, the index line also being shown in three different positions with reference to the numerals.

Figure VII shows a group of my improved numerals as printed on the chart, but greatly enlarged.

Figure VIII shows the same group of numerals as they appear when magnified according to the invention.

Since this invention is applicable to all types of computing scales having cylindrical drums, I have not shown such a scale in detail, but for the details of its mechanical construction, I refer to United States Patent No. 1,166,128 to C. H. Hapgood.

The housing 1 which contains the counterbalancing mechanism is usually mounted on a base (not shown) which supports the load receiving means. Surmounting the housing 1 is a chart casing 2 containing the indicating mechanism and reading means. These means comprise a cylindrical rotary chart 3 consisting of a shaft 4 supporting a plurality of spiders made from light material which are secured to the shaft by means of suitable hubs (not shown). The spiders are surrounded by a chart 6, which in this case is formed of a very thin sheet of aluminum for reasons which will hereinafter be explained. This sheet is electro-chemically treated forming a white aluminum oxide on its surface to offer a contrast to the graduations and other indicia which are printed thereon. This etch also serves to prevent the formation of light reflections which would interfere with the operator when reading the chart. The shaft 4 is mounted at its ends in suitable anti-friction ball bearings (not shown) and is provided with a pinion 7, the teeth of which mesh with the teeth of a rack 8 extending downwardly through one of the tubes 9, interposed between the housing 1 and the casing 2, and pivotally connected to the counter-balancing mechanism (not shown) located within the housing 1.

Weighing mechanisms used in scales of this type have movement, the extent of which is a function of the weight of the load on the load receiver. The rack is so connected to the weighing mechanism that its movement is in proportion to this weight and the chart therefore, traverses a proportionate angle. The casing 2 has two rectangular openings 11 and 12. These openings are respectively covered by a front indicator frame 13 and a back indicator frame 14. A window 15 is provided in the frame 13 and is glazed with a pane 16. This pane is retained by a lens bracket 17, secured to suitable bosses cast on the frame 13, by a plurality of screws 18 which extend through elongated slots 19. The back frame 14 is of similar construction with the exception that the window 20 is filled by a pane of glass 21 which is retained by the screws 22, no lens bracket being provided. This side of the scale is known as the "customer's side" and only the weight indications are visible through an opening in the plate 23. It is customary to print suitable wording and directions for the customer's instruction thereon. The opening in the casing which is enclosed by the frame 13 is on the merchant's side and the window 15 extends the entire length of the chart.

A compound achromatic cylindrical lens 24 is mounted in the lens bracket 17. This lens comprises a convexo-convex simple cylindrical lens 25 and a plano concave cylindrical lens 26, one of which is made of crown glass and the other of flint glass to impart achromatic qualities. Due to the employment of this type of lens which permits relatively high magnification, I am enabled to print the value computations on the chart with comparatively small numerals, much smaller than those heretofore used on charts of this type. This enables me to provide many more graduations and computations, but it also requires that a specially designed numeral be used. The numerals which I employ are shown greatly enlarged in Figure VII. The vertical dimensions of these figures are greatly condensed and all horizontal dimensions appear relatively broad when the figures are undistorted by a lens. When viewed through the compound cylindrical lens, forming a part of this invention, which magnifies only the vertical dimensions, the numerals appear as shown in Figure VIII.

The pertinent weight and value numerals are indicated by a thread or a thin wire 27 which is stretched closely adjacent the outer surface of the chart 6 and is fastened to either end of a frame 28 provided with an opening through which the chart is visible. The edge adjacent the lower side 29 of the opening has printed thereon the unit prices 30 of commodities which form the factors of the computations. Since the numerals which are printed on the chart are very small in their vertical dimensions and owing to the high magnifying power of the lens, this indicating line 27 must be placed very close to the chart. For this reason it is necessary that the chart be made much more accurately and with much greater care than charts heretofore used. It is also necessary to make the chart from a comparatively stiff material such as a sheet of aluminum or magnesium. A paper sheet cannot be stretched tightly around the chart spiders without being drawn in between the spiders and thus losing its true cylindrical shape, therefore, a line cannot be placed in as close proximity to a paper chart as is required by the instant invention.

I have also found that a careless clerk may make mistakes in reading the value numerals of scales in use prior to my invention because portions of the numerals are covered by the indicating wire. This is much more probable when the ratio of the vertical height of the numeral and the thickness of the index wire is rather small, as it must necessarily be in the embodiment of this invention, and a correspondingly greater portion of the numeral is hidden by the wire. I have, therefore, provided numerals of improved design which are so proportioned that when the wire covers a large portion of them, the parts which project will have such significance as to make errors due to mistaking one character for another almost impossible. I have shown in Figure V and Figure VI comparative examples of the numerals of my design and of the conventional type heretofore used, each partially covered by a line, the thickness of which is proportional to the size of the numerals as they appear when the scale is read.

It will be seen from Figure V that many mistakes may occur when the wire covers up portions of the numerals, for example, in the upper group of numerals in which the index wire covers the central portion of the figures, the numeral eight looks like a zero. A careless observer might also mistake the numerals six and nine for that figure. The other two groups of Figure V also show examples of sources of errors. The groups of numerals are shown greatly enlarged and their distinctiveness is much greater than when they are printed on a scale chart and a portion covered by a wire. Figure VI shows the same groups of numerals and the indicating wire in the same positions and covering up the similar portions, but the numerals being of my improved design. The portion of the numerals which project beyond the index wire have such distinctive characteristics that a comparison between these two groups will plainly show that the possibility of misreading a figure due to the covered portion is entirely obviated.

Due to the high magnification of the lens, it is necessary that its longitudinal axis lie approximately in a plane with the longitudinal axis of the chart. I accomplish this by making the lens bracket 17, in which the lens 24 is mounted, adjustable, with reference to the axis of the chart. The bracket 17 is provided with laterally extending ears 31 and horizontally extending lugs 32. These lugs have apertures through which adjusting screws 33 are threaded. These adjusting screws project through apertures in lugs 34 which extend horizontally from the back of the scroll 13. Each of the adjusting screws has a narrow groove turned in its body into which the tines 35 of a forked angle bracket 36 project. This bracket is held in position by the screw 37 and it effectively prevents vertical motion of the screw 33, though it allows its rotation. The ears 31 which are fastened to the bracket 17 are provided with slots 19 through which the screws 18 project. When the scroll is adjusted, the screws 18 are tightened and thus hold the bracket 17 immovable. When it is desired to adjust the position of the lens bracket, the screws 18 are slightly loosened and by turning both the screws 33, the same number of times, the lens and bracket may be shifted up or down evenly or by loosening one screw slightly and tightening the other or by turning each screw a different number of times, the axis of the lens may be brought into a plane in which the axis of the chart lies.

The embodiment of my invention herein shown and described is to be regarded as illustrative only, and it is to be understood that the invention is susceptible to variation, modification and change within the spirit and scope of the subjoined claims.

Having described my invention, I claim:—

1. In a weighing scale, in combination, a chart bearing a series of value computations, the numerals thereof having short, thick vertical strokes and comparatively long, thin horizontal strokes, and a lens curved about a linear axis lying substantially horizontally in front of said chart, said lens having proper magnifying power for substantially equalizing the apparent thickness of said vertical and horizontal strokes and for correspondingly increasing the apparent length of said vertical strokes.

2. In a weighing and price computing scale, in combination, indicating means comprising a rotary chart bearing a plurality of series of computed values, being the product of weights and unit prices of commodities, said computed values being represented by numerals having short, thick vertical strokes and comparatively long, thin horizontal strokes, and a lens curved about a linear axis lying substantially horizontally in front of said chart, said lens being adapted to magnify vertical dimensions only and the magnifying power of said lens being such that in the virtual image of said numerals all strokes appear as being substantially equal in thickness and the average height of the numerals appears greater than the average width.

3. In a weighing scale, in combination, a chart bearing value computations, the numerals thereof having thick vertical strokes and comparatively thin horizontal strokes and wide horizontal dimension and relatively short vertical dimension and a lens curved about a horizontal axis and constructed and arranged to equalize the apparent thickness of said vertical and horizontal strokes and to elongate the apparent vertical dimension of said numerals.

LAWRENCE S. WILLIAMS.